May 12, 1925.  1,537,857
E. MILLER
PARISON MOLD
Filed Dec. 31, 1924
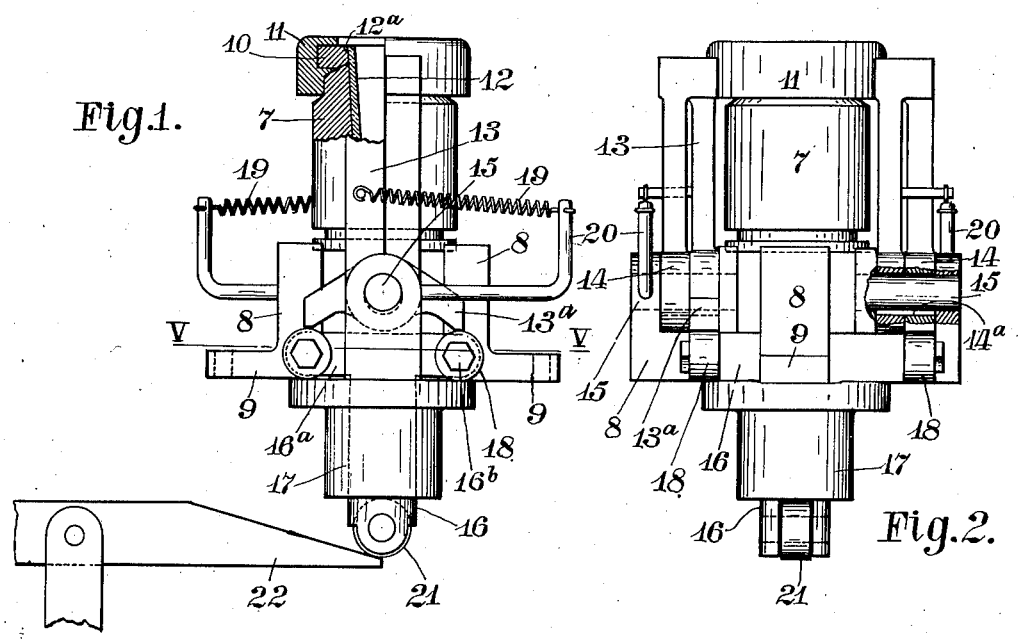
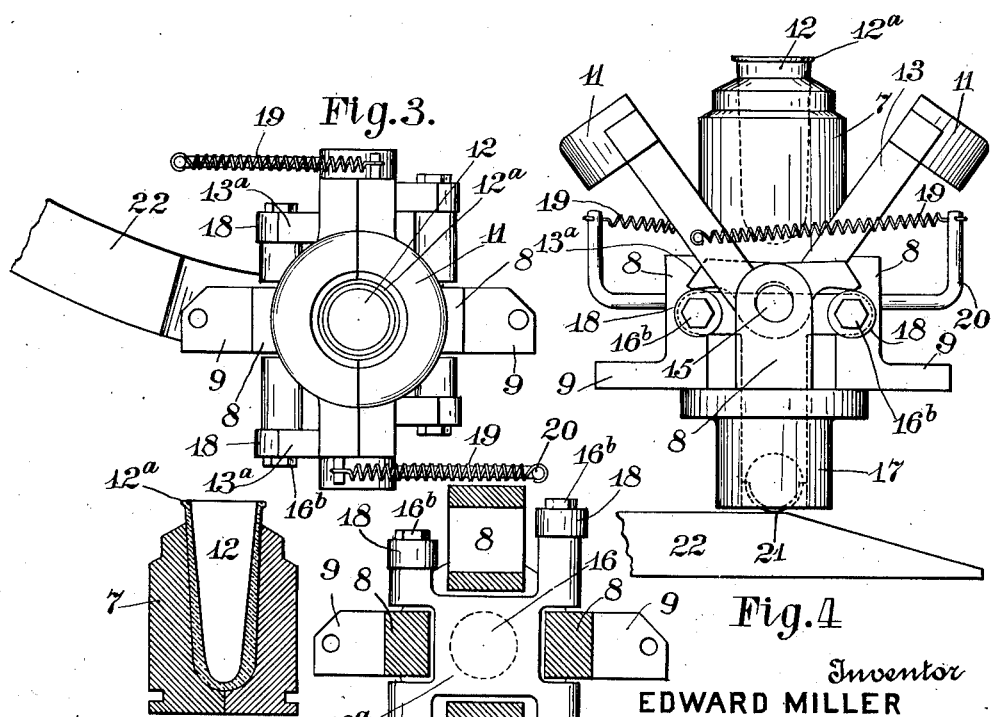
Inventor
EDWARD MILLER
his Attorneys Patented May 12, 1925.

1,537,857

UNITED STATES PATENT OFFICE.

EDWARD MILLER, OF COLUMBUS, OHIO.

PARISON MOLD.

Application filed December 31, 1924. Serial No. 759,200.

*To all whom it may concern:*

Be it known that I, EDWARD MILLER, a citizen of the United States, residing at Columbus, in the county of Franklin and State of Ohio, have invented a certain new and useful Improvement in Parison Molds, of which the following is a specification.

In modern automatic machines for molding hollow glass ware the batch is first given a preliminary form called a "parison" in what is termed a parison mold. The parison is removed from its mold and transferred to the "blow" mold where it is given the final form. In removing the parison from its mold a pin sliding in a hole in the bottom of the mold has been employed to lift the parison to dislodge it from its mold wall and the ring mold sections separated horizontally to permit apprehension of the parison at its upper end by the means for transferring it to the blow mold; but the contact of the dislodging pin left on the parison an objectionable imprint or mark that was not obliterated by the blowing operation. Such unsightly mark in the final product rarely occurred centrally on the bottom of the object, tumbler for example, as finally molded but more frequently attained an eccentric position and it was attempted to conceal or obscure it by impressing over it an elaborate design on the bottom of the tumbler but without success.

The principal aim of the present invention is to do away with said lifting pin and provide means whereby the parison is detached from its mold by lifting the parison at other points and without leaving objectionable marks thereon.

The invention is embodied in the example herein shown and described the features of novelty being finally claimed.

In the accompanying drawing—

Fig. 1 is a front elevation with parts in section showing the parison mold, neck ring and holder therefor with a parison therein ready for removal.

Fig. 2 is an elevation looking at the right hand side of Fig. 1 with parts broken out.

Fig. 3 is a top plan view of Fig. 1.

Fig. 4 is an elevation like Fig. 1 with the neck ring and its holder in opened position.

Fig. 5 is a horizontal sectional view on line V—V Fig. 1.

Fig. 6 is a central vertical section of the parison alone with a parison therein.

In the views 7 designates the parison mold which is mounted on a frame 8 having perforated feet 9 for bolting it to an ordinary revolving mold carrier such as employed in modern automatic glass molding machines.

10 designates the semi-circular neck ring section and 11 the respective holders in which the neck ring sections are suitably secured.

The neck ring sections are formed at their upper corners to mold lips 12$^a$ on the parison 12. Each section of the neck ring mold holder has fixed with and extending downward from it a bell crank lever comprised of a longer arm or portion 13 and a shorter or tappet-like portion 13$^a$ with a fulcruming collar bearing 14 between them. The openings 14$^a$ of these bearings are slightly elongated vertically so as to allow a slight preliminary upward movement of the arms 13 and neck ring sections with reference to a bearing shaft 15 extending horizontally through ears of the main frame 8.

16 is a piston-like post or column working in a cylindrical sleeve 17 extending downward from the main frame. The upper end of said post 16 has a frame 16$^a$ carrying four pins 16$^b$ provided with antifriction rollers 18 one of which extends below each of the tappet-like arms 13$^a$.

Each section of the neck ring holder has connected to one of its supporting arms 13 one end of a coil spring 19 the other end of which is connected with a bent rod 20 fixed to the frame 8. The springs 19 are of sufficient tension to draw together and yieldingly retain the neck ring holder sections with their combined neck ring sections closed in molding position at the top of the parison mold.

The lower end of the piston-like post 16 is provided with an anti-friction roller 21 that rides up a stationary cam 22 as the parison mold and its appurtenances are carried in a circle in the operation of the molding machine.

The operation is this: At the time the parison mold receives a batch of molten glass to be formed into a parison the neck ring and holder may be closed as shown in Figs. 1, 2 and 3. The parison mold is then carried to position under a plunger that imparts to the glass the form indicated in Figs. 1 and 6, the neck ring sections being held clamped together as usual in this operation. After the withdrawal of the parison forming plunger the parison mold and the parts are carried over the cam 22 thereby causing the post 16 to rise and with it the rollers 18 which lift upward the tappet-like portions 13ᵃ, arms 13 and neck ring sections. Because of the elongated bearing in the parts 14 the initial movement upward of the arms 13 is direct thereby causing the neck rings which are engaged with the lip 12ᵃ of the parison to liberate or loosen the parison from the wall of the mold. After the initial direct upward thrust of the neck ring the movement of the arms 13 and the neck ring sections is outward from each other on an arc having for its center the axis of the shaft 15 as depicted in Fig. 4. This separation of the neck rings affords access of the transferring means for taking hold of the upper end of the loosened parison to remove and deposit it in the blow mold.

The forms of the parts can be changed without departing from the gist of the invention as claimed.

What I claim is:

1. In combination with a parison mold, a neck ring mold composed of sections, levers supporting said sections and fulcrums for said levers extending at right angles to the axis of the parison mold, and means for actuating said levers to open and close said neck ring sections.

2. In combination with a parison mold, a neck ring mold composed of sections, levers supporting said sections and fulcrums for said levers extending at right angles to the axis of the parison mold, and springs for moving said levers to close the neck ring sections and cam actuated means for actuating said levers to separate the neck ring sections.

3. In combination with a parison mold, a neck ring mold composed of sections, levers supporting said sections and fulcrums for said levers extending at right angles to the axis of the parison mold, means for actuating said levers to open and close said neck ring sections and means whereby said levers are initially moved to detach the parison from the mold wall.

4. In combination with a parison mold, a neck ring mold composed of sections, levers supporting said sections and fulcrums for said levers extending at right angles to the axis of the parison mold, means for actuating said levers to open and close said neck ring sections and means for initially detaching the parison from the mold wall consisting of elongated bearings for the levers.

5. The combination with a parison mold, a neck ring mold composed of sections, means for moving the neck ring sections first to detach the parison from its molding wall and then to separate the neck ring sections from the parison.

6. The combination with a parison mold, a neck ring mold composed of sections, means for moving the neck ring sections first to detach the parison from its molding wall by engagement at the open end of the parison and then to separate the neck ring sections from the parison.

EDWARD MILLER.